(12) United States Patent
Das

(10) Patent No.: US 8,977,575 B2
(45) Date of Patent: Mar. 10, 2015

(54) CONFIDENCE LEVEL GENERATOR FOR BAYESIAN NETWORK

(75) Inventor: Sreerupa Das, Oviedo, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 977 days.

(21) Appl. No.: 12/839,929

(22) Filed: Jul. 20, 2010

(65) Prior Publication Data

US 2012/0023042 A1    Jan. 26, 2012

(51) Int. Cl.
*G06N 7/00* (2006.01)

(52) U.S. Cl.
CPC ..................... *G06N 7/005* (2013.01)
USPC .......................................... 706/12

(58) Field of Classification Search
CPC ..................................... G06N 7/005
USPC .......................................... 706/12
See application file for complete search history.

(56) References Cited

PUBLICATIONS

Das et al ("Estimating Accuracy and Confidence Interval of an Intelligent Diagnostic Reasoner System" Sep. 14-17, 2009).*
Schweder et al ("Confidence and Likelihood" 2001).*
Author unknow, date unknown ("Autotestcon 2009 call for paper").*
Tang et al ("Methodologies for Uncertainty Management in Prognostics" Mar. 2009).*
Cosgriff, P., et al., "Intelligent Diagnostic Reasoning System deployment process and results", Proceedings of the IEEE AUTOTESTCON 2008, (2008), 154-158.
Devore, J. L., "", Probability and Statistics for Engineering and Sciences, 3rd Edition, Brooks/Cole Publishing Company, (1991), 220-224.
Dijkistra, T. K, "", On Model Uncertainty and its Statistical Implications : Proceedings of a Workshop held in Groningen, the Netherlands, Sep. 25-26, 1986, Berlin ; New York : Springer-Verlag, (1986), 138 pgs.
Harris, M., et al., "Augmenting fielded test systems with diagnostic reasoner technology", Proceedings of the IEEE AUTOTESTCON 2007, (2007), 123-128.
Picard, R., et al., "Cross-Validation of Regression Models", Journal of the American Statistical Association, 79(387), (1984), 575-583.

* cited by examiner

*Primary Examiner* — Lut Wong
(74) *Attorney, Agent, or Firm* — Schwegman Lundberg & Woessner, P.A.

(57) ABSTRACT

A system includes a computer implemented Bayesian diagnostic system. The diagnostic system includes an inferencing engine and a conditional probability table that forms the basis for Bayesian inferences once the diagnostic system is trained. Each inference includes a diagnosis and associated probability of the diagnosis. A confidence generator receives the inferences, and generates a confidence measure for each inference.

18 Claims, 5 Drawing Sheets

| TEST | TEST RESULT | BAD COMPONENT | # OF OBSERVATIONS |
|---|---|---|---|
| T1 | FAIL | B1 | 5 |
| | PASS | B1 | 5 |
| | PASS | B2 | ... |
| | PASS | B3 | ... |
| | ... | ... | ... |
| T2 | FAIL | B1 | 7 |
| | FAIL | B2 | 5 |
| | PASS | B1 | 3 |
| | PASS | B2 | 0 |
| | PASS | B3 | ... |
| | ... | ... | ... |

*FIG. 3*

| CONFIDENCE LEVEL $P(z<Z<z)$ | α | $Z_{a/2}$ |
|---|---|---|
| 80% | .1 | 1.282 |
| 90% | 0.5 | 1.645 |
| 95% | 0.25 | 1.96 |
| 98% | .01 | 2.326 |
| 99% | .005 | 2.576 |

CONFIDENCE LEVEL GENERATOR FOR BAYESIAN NETWORK

BACKGROUND

Bayesian Networks are becoming an increasingly important area for research and application in the fields of Artificial Intelligence, Medical Sciences, Bio Informatics and other inference tasks in Engineering. The main reason of popularity is due to the fact that classical inferential models do not permit the introduction of prior knowledge into the calculations as easily as in the Bayesian approach. The task of training a Bayesian Network from a training dataset involves trying to learn a model that best represents the underlying distribution or relationships in the training data. The ultimate goal of the Bayesian Network is to be able to perform correct inference on new data. Since the available training data is never complete in the real world, the trained model is usually only an approximation of the actual underlying function.

Cross validation is a method commonly used to estimate how accurately a trained Bayesian Network (or any learning model) will perform in practice. The reasoning behind using a cross validation technique is as follows: The training of a Bayesian model optimizes the model parameters to make it fit the training data as close as possible. Given an independent sample of validation data from the same population of the training data, it will generally turn out that the model does not fit the validation data as well as it fits the training data. This is particularly likely to happen when the size of the training data set is small, or when the number of parameters in the model is large. Cross validation is a way to estimate how good the model will perform with future data.

SUMMARY

A system includes a computer implemented Bayesian diagnostic system. The diagnostic system includes an inferencing engine and a conditional probability table that forms the basis for Bayesian inference once the diagnostic system is trained. Each inference includes a diagnosis and associated probability of the diagnosis. A confidence generator receives the inferences, and generates a confidence measure for each inference.

BRIEF DESCRIPTION OF THE DRAWINGS

FIG. 3 is a conditional probability table on which inferences are based according to an example embodiment.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

A confidence interval is generated for an estimated accuracy of a diagnosis by a Bayesian Network diagnostic system. The confidence interval defines how close this estimate is to the actual accuracy of the Bayesian Network model. A confidence interval for each (individual) diagnosis made by the Bayesian Network may also be generated.

In one embodiment, the confidence interval of the accuracy of a Bayesian Network may be calculated at any instance (even during training). A Bayesian Network in an intelligent diagnostic reasoner system may not have sufficient information to make a reasonable diagnosis. Nonetheless, a learning algorithm instrumented to run nightly does continue training the system over time. As the Bayesian Network is trained, its overall expected accuracy and confidence intervals are expected to improve with time. Therefore, the overall system accuracy and its confidence interval may be used as an indicator of when the diagnostic system is ready for plausible analysis. In one embodiment, the confidence of each individual diagnosis (or prediction) made by a Bayesian network may be computed. The measure of confidence interval on a per-diagnosis basis allows users to decide how much importance needs to be placed on a particular diagnosis.

Figure 1A:
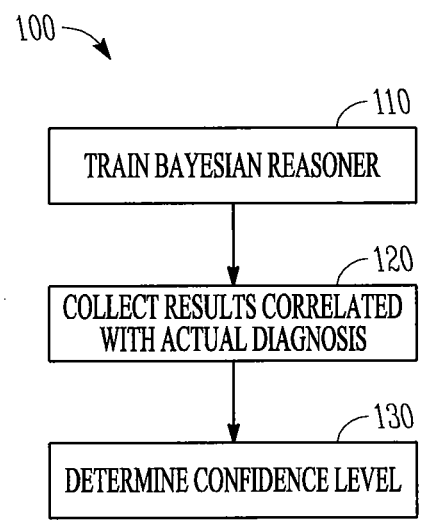
FIG. 1A is a high level flowchart of a computer implemented method of determining a confidence level for a Bayesian network according to an example embodiment.

FIG. 1A is a high level flowchart of a computer implemented method of determining a confidence level for a Bayesian network. At 110, training is conducted on a Bayesian diagnostic network. The training may consist of historical input data collected from one or more observations or tests, and the network is provided a corresponding actual diagnosis or result to be derived from the input data. An at least partially trained network uses the training to determine a probability of a result from new input data presented to it. The new input data may correspond to more training data having known desired results, or actual data.

During training, the network develops a conditional probability table that is used for Bayesian inference to provide the probabilities as shown at 120. Results are collected and correlated with actual diagnoses indicated in the training data. Using the collected results, a confidence level is determined at 130. The confidence level may be determined for individual inferences as well as for a cumulative confidence for multiple inferences.

Figure 1B:
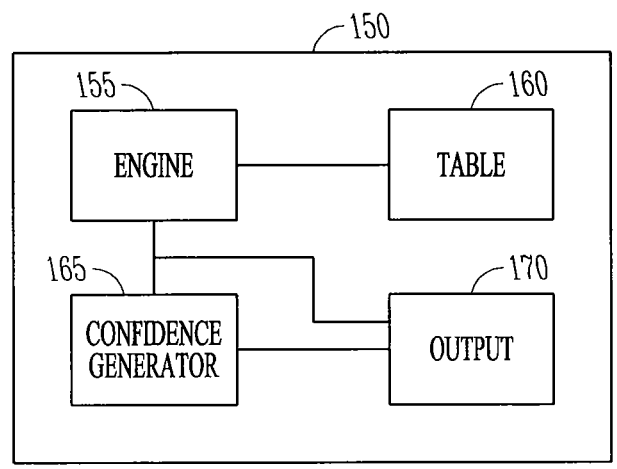
FIG. 1B is a high level block diagram illustrating a Bayesian network diagnostic system having a confidence generator according to an example embodiment.

FIG. 1B is a high level block diagram illustrating an example Bayesian network diagnostic system 150. System 150 has an inferencing engine 155 that utilizes a conditional probability table 160 to generate inferences. The inferences are provided to a confidence generator 165, and an output 170. The confidence generator 165 is also coupled to the output 170 to provide a confidence measure of the generated inference.

Figure 2:
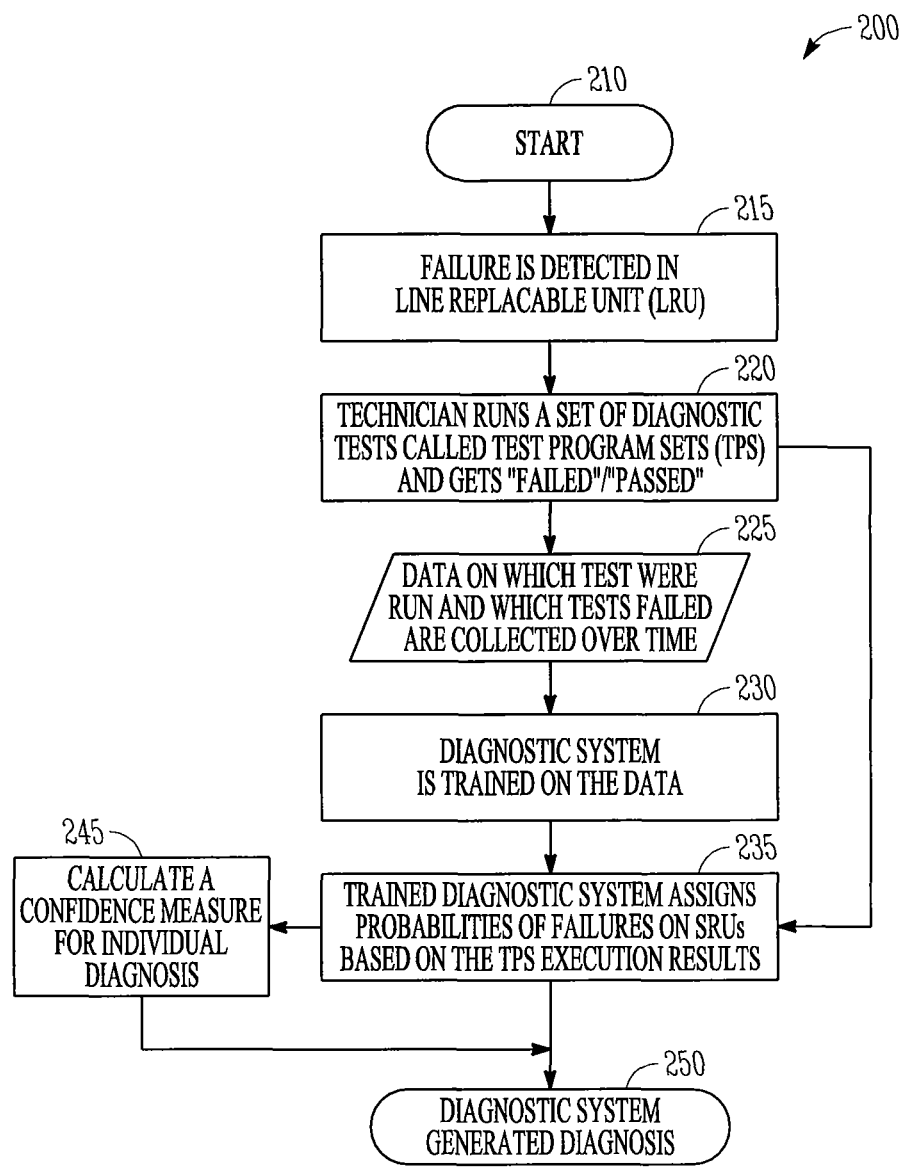
FIG. 2 is a flow diagram illustrating further detail of the method illustrated in FIG. 1 according to an example embodiment.

In one example embodiment as shown in flowchart form in FIG. 2 at 200, an inference engine is applied to detecting failures in components. This is just one example of the situations in which a Bayesian inference engine may prove valuable in providing probabilities of one or more diagnosis or result. A Line Replaceable Unit (LRU) is a complex component of an airplane, helicopter or ship. LRUs are designed to be replaced quickly at the organizational level. LRUs speed up repair, because they can be stocked and replaced quickly from inventory, restoring the larger system to service. LRUs also may reduce the cost of systems, and increase the quality by spreading development costs of the type of unit over different models of vehicles.

When faults are detected in LRUs at 215, they are sent to a repair shop for further analysis and repair. LRUs contain a set of components, including shop replaceable units (SRUs). At the repair shop, technicians run a set of diagnostic tests called Test Program Sets (TPS) and make a note of which tests passed or failed at 220. Based on the results of the failed tests and based on past experience and maintenance logs of previous maintenance actions, technicians determine which Shop Replaceable Units (SRU) caused the LRU failure. Diagnosing faults in SRUs takes a long time and are very prone to human errors.

In one example diagnostic system, a Bayesian Network may be used to mitigate the problem. Such a system may shorten the diagnosis time and increase reliability in Diagnosis by isolating faults quickly and reducing ambiguity. The Bayesian network may be trained with historical test and maintenance data as collected at 230 to develop diagnostic model enabling intelligent decision support. Once trained at 235, the Bayesian network is able to reason intelligently and assign probabilities corresponding to component(s) that may have gone bad and need replacement given a set of failed diagnostic tests.

The performance of a diagnostic system may often be dependent on the amount of training data. Field data used as training data is often very sparse or inadequate. There may be many hundreds of tests and components, and often not sufficient data to derive a complete conditional probability table (CPT) for each result. Richness of the data set (e.g., how well do test failures and bad components correlate in the data, is there noise in data) may also be lacking. The field data usually contains some amount of noise (incorrect data or actual results) due to the fact that part/component numbers after remove and replace are manually entered in the system.

Although a diagnosis is very valuable, there is no way to tell how "good" is the diagnosis generated by the diagnostic system. In other words, there is no way to tell if the inferred probabilities generated by the system are really meaningful and may be used with confidence. Embodiments described provide confidence measures at 245 for individual diagnosis 250 generated by a diagnostic system. If a certain diagnosis (e.g., probability of component C_1 being bad) can be backed by a measure of confidence, then appropriate importance can be assigned to the diagnosis. In any learning system, when it is just starting to learn, its performance will obviously be poor and hence diagnosis will not be correct. A low measure of confidence for individual diagnosis will indicate that the system is not confident about its own diagnosis. Also, training data is never complete. So, even after the system has trained sufficiently, if the trained system sees a new input pattern (e.g., a new set of failed tests that it had not seen before), its diagnosis of the faulty component will be sufficiently poor. The confidence measure would be reflective of such uncertainty.

In one embodiment, field data that diagnostic system uses for training is of the form shown in a conditional probability table (CPT) 300 in FIG. 3. The data represents how many times a test was observed to have failed when the corresponding component was bad. For example, at 310, the $1^{st}$ row implies that there were five observations where test T1 failed when B1 was the bad component (had to be replaced). The second row indicates that there were five observations where test T1 was passed when B1 was the bad component.

Based on the number of observations of failed tests and bad components, the conditional probability tables are created using probability theory. This is often called the training phase. Once trained, CPTs form the basis for all Bayesian inference. During the inference phase, when presented with a set of failed diagnostic tests, diagnostic system is able to assign probabilities of failure to each component—thus providing a diagnosis of components that might have gone bad.

The confidence measure in the diagnosis of a component is computed in one embodiment as follows:
Define, variance, $v_{ij} = p_{ij}(1-p_{ij})/\{\alpha(\log N_{ij})\}$ and confidence, $c_{ij} = 1 - v_{ij}$ Where, $p_{ij}$=prior probability of test $T_j$ failing when component $B_i$ is bad
$N_{ij}$=number of observations involving $T_j$ and $B_i$
$\alpha$=a constant (derived from experiments) to normalize variance between 0 and 1. (Typically, $\alpha$ is a number close to 0.25 to balance the maximum value of p (1−p))

If $N_1$ is large or if $p_{ij}$ is close to 0 or 1, confidence is high. In one embodiment, $\log(N_{ij})$ is used as opposed to as it is more appropriate for use in the embodiment described above in CPS 300. In the data above, T2 seems to be closely correlated with B2 and probability ($p_{22}$) of T2 failing when B2 is bad is 1.0 (for simplicity, assume no past history), thus variance is 0 and hence confidence level of B2 with respect to T2 is 1. Whereas confidence for B1 with respect to T2 is relatively low ($p_{11}$ is close to 0.5, thus variance is close to 1 (assume $\alpha$ is 0.25).

Given a set of failed tests $T=\{T_1, T_2, \ldots, T_t\}$, a cumulative confidence measure is defined as:

$$C_k = \frac{1}{t}\sum_{j=o}^{t} c_{kj}$$

for each component $B_k$,
Where t is the number of tests that failed, and $c_{kj}$ is the confidence level of $B_k$ with respect to test $T_j$.

Another variation of the Cumulative confidence is to weight the individual confidences with the probabilities as follows:

$$C_k = \frac{1}{t}\sum_{j=o}^{t} p_{kj}c_{kj}$$

for each component $B_k$
Therefore, while diagnosing component $B_k$, the confidence of a test with stronger diagnosis will dominate.

Cumulative confidence values are reported along with the inferred probabilities for each component during diagnosis in one embodiment. Cumulative confidence of a particular component represents the amount of faith the Bayesian network has on its own diagnosis. A smaller value of confidence would imply that although it came up with a certain probability of failure for the component, it does not have enough confidence in the inference possibly due to insufficient or ineffective data.

The measure of confidence will allow users to be aware of the confidence levels when evaluating (or further processing) the diagnoses made by the system. A user may see a low confidence level in a diagnosis, and decide to investigate further, such as by running more tests, or using visual inspection of a component.

In a further embodiment, an alternative way to compute a confidence interval of individual diagnosis made by the diagnostic system is used. The confidence interval defines how close the estimated diagnosis (probability) is to the true diagnosis. As the Bayesian Network in the diagnostic system is trained, its confidence intervals are expected to improve with time. Therefore, the confidence intervals may be used as an indicator of when the diagnostic system is ready to provide plausible diagnosis. In one embodiment, a predetermined threshold for a confidence interval is used as such an indicator. The threshold may be varied for various diagnostic systems as a function of the nature of the underlying application.

In one embodiment, confidence intervals of individual diagnosis are calculated. Given that a set of tests (in TPS), $T=\{t_1, t_2, \ldots t_n\}$, has failed, it is assumed that the model has diagnosed components, $C=\{c_1, c_2, \ldots, c_m\}$, as bad with probabilities $\{\hat{p}_1, \hat{p}_2, \ldots, \hat{p}_m\}$. From the training data, $h_i$, a dataset that associates the test set T and component $c_i$, may be identified as follows:

$$h_i = \sum_{\forall t_j \in T} \text{fail}_{ij} + \text{pass}_{ij} \quad (1)$$

Where $\text{fail}_{ij}$=number of observations where test $t_j$ failed when $c_i$ was bad and $\text{pass}_{ij}$=number of observations where test $t_j$ passed when $c_i$ was bad. Using similar analysis as before, the expected probability of diagnosis and its confidence interval are defined as follows.

The expected probability of diagnosing component $c_i$ as bad when test set T failed can be expressed as:

$$E(p_i) = \hat{p}_i \quad (2)$$

And corresponding variance as:

$$v_i = p_i(1-p)/h_i \quad (3)$$

where $p_i$ is the true probability of component $c_i$ being bad when test set T fails.

If size of the data set $h_i$ is large enough, $E(p_i)$ has a standard normal distribution (bell curve) with standard normal random variable Z defined as:

$$Z = \frac{\hat{p}i - pi}{\sqrt{pi(1-pi)/hi}} \quad (4)$$

Figures 4, 5:
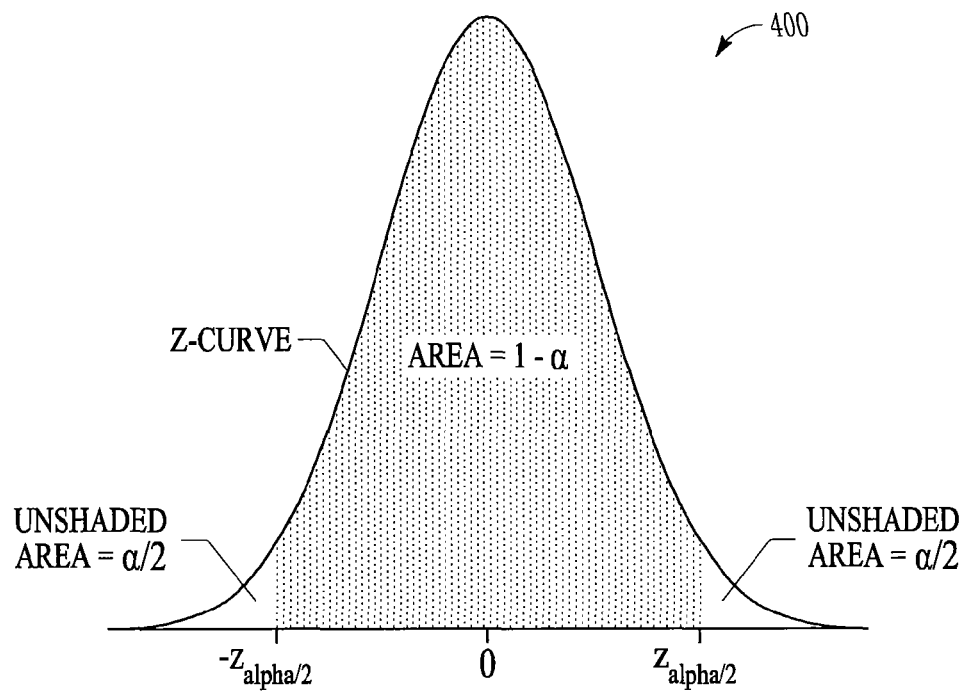
FIG. 4 is a graph illustrating a z-curve in which a shaded area represents a confidence level according to an example embodiment.
FIG. 5 is a table illustrating various confidence levels according to an example embodiment.

FIG. 4 illustrates a z-curve at 400 in which the shaded area in the z-curve above represents the confidence level $P(-z_{\alpha/2}<Z<z_{\alpha/2})=1-\alpha$. For a normal distribution, given a value of Z (say z), the probability density function $P(-z<Z<z)$ is the shaded area under the under the curve bounded by $[-z, +z]$. If the value of z=1.96, the area under the curve is approximately 0.95. That is, $P(-1.96<Z<1.96)\approx0.95$, and hence the values of Z in $[-1.96, 1.96]$ define the 95% confidence interval. Similarly, since $P(-2.576<Z<2.576)\approx0.99$, the values of Z in $[-2.576, 2.576]$ define the 99% confidence interval. The % confidence interval is also expressed as $100(1-\alpha)$ %.

A table 500 in FIG. 5 lists some of the commonly used confidence levels and their corresponding $\alpha$ and $z_{\alpha/2}$ values. A $100(1-\alpha)$ % confidence interval (shaded area in FIG. 4.) may be defined as:

$$P(-z_{\alpha/2}<Z<z_{\alpha/2})=1-\alpha. \quad (5)$$

Hence, substituting (4) in (5), $$P\left(-z_{\alpha/2} < \frac{\hat{p}i - pi}{\sqrt{pi(1-pi)/hi}} < z_{\alpha/2}\right): \quad (6)$$

Replacing each '<' by '=' in (6) yields a quadratic equation in $\hat{p}_i$ whose solutions are:

$$p_i = \frac{\hat{p}_i + \frac{Z_{\alpha/2}^2}{2h_i} \pm Z_{\alpha/2}\sqrt{\frac{\hat{p}_i(1-\hat{p}_i)}{h_i} + \frac{Z_{\alpha/2}^2}{4h_i^2}}}{1 + (Z_{\alpha/2}^2)/h_i} \quad (7)$$

The '+' sign goes with the upper endpoint of the interval and the '−' sign goes with the lower endpoint. These two values of $p_i$ define the confidence interval of the true accuracy of the model. It is evident in equation (7) that, if certain tests have been observed to fail more often when a particular component $c_i$ is bad, then $h_i$ would be high and hence the confidence interval would be narrower, indicating that the system has more confidence in predicting failure of component $c_i$.

Figure 6:
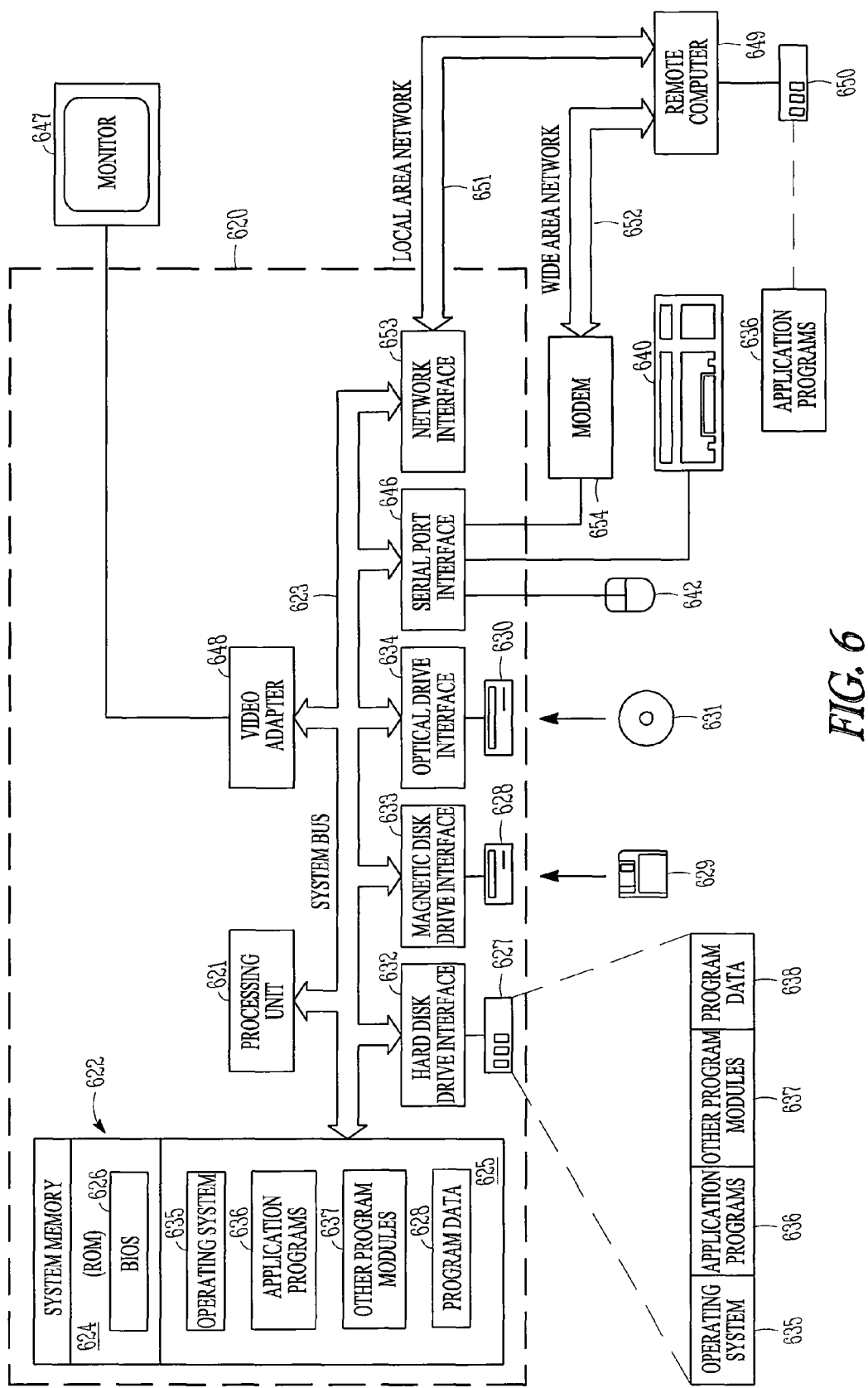
FIG. 6 is a block diagram of an example computer system for implementing the network.

A block diagram of a computer system that executes programming for implementing a diagnostic system with confidence measures as described above is shown in FIG. 6. FIG. 6 is an overview diagram of a hardware and operating environment in conjunction with which embodiments of the invention may be practiced. The description of FIG. 6 is intended to provide a brief, general description of suitable computer hardware and a suitable computing environment in conjunction with which the invention may be implemented. In some embodiments, the diagnostic system may be implemented with computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 6, a hardware and operating environment is provided that is applicable to any of the servers and/or remote clients shown in the other Figures.

As shown in FIG. 6, one embodiment of the hardware and operating environment includes a general purpose computing device in the form of a computer 620 (e.g., a personal computer, workstation, or server), including one or more processing units 621, a system memory 622, and a system bus 623 that operatively couples various system components including the system memory 622 to the processing unit 621. There may be only one or there may be more than one processing unit 621, such that the processor of computer 620 comprises a single central-processing unit (CPU), or a plurality of processing units, commonly referred to as a multiprocessor or parallel-processor environment. In various embodiments, computer 620 is a conventional computer, a distributed computer, or any other type of computer.

The system bus 623 can be any of several types of bus structures including a memory bus or memory controller, a peripheral bus, and a local bus using any of a variety of bus architectures. The system memory can also be referred to as simply the memory, and, in some embodiments, includes read-only memory (ROM) 624 and random-access memory (RAM) 625. A basic input/output system (BIOS) program 626, containing the basic routines that help to transfer information between elements within the computer 620, such as during start-up, may be stored in ROM 624. The computer 620 further includes a hard disk drive 627 for reading from and writing to a hard disk, not shown, a magnetic disk drive 628 for reading from or writing to a removable magnetic disk 629, and an optical disk drive 630 for reading from or writing to a removable optical disk 631 such as a CD ROM or other optical media.

The hard disk drive 627, magnetic disk drive 628, and optical disk drive 630 couple with a hard disk drive interface 632, a magnetic disk drive interface 633, and an optical disk drive interface 634, respectively. The drives and their associated computer-readable media provide non volatile storage of computer-readable instructions, data structures, program modules and other data for the computer 620. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 629, optical disk 631, ROM 624, or RAM 625, including an operating system 635, one or more application programs 636, other program modules 637, and program data 638. A plug in containing one or more modules can be resident on any one or number of these computer-readable media.

A user may enter commands and information into computer 620 through input devices such as a keyboard 640 and pointing device 642. Other input devices (not shown) can include a microphone, joystick, game pad, satellite dish, scanner, or the like. These other input devices are often connected to the processing unit 621 through a serial port interface 646 that is coupled to the system bus 623, but can be connected by other interfaces, such as a parallel port, game port, or a universal serial bus (USB). A monitor 647 or other type of display device can also be connected to the system bus 623 via an interface, such as a video adapter 648. The monitor 640 can display a graphical user interface for the user. In addition to the monitor 640, computers typically include other peripheral output devices (not shown), such as speakers and printers.

The computer 620 may operate in a networked environment using logical connections to one or more remote computers or servers, such as remote computer 649. These logical connections are achieved by a communication device coupled to or a part of the computer 620; the invention is not limited to a particular type of communications device. The remote computer 649 can be another computer, a server, a router, a network PC, a client, a peer device or other common network node, and typically includes many or all of the elements described above I/O relative to the computer 620, although only a memory storage device 650 has been illustrated. The logical connections depicted in FIG. 6 include a local area network (LAN) 651 and/or a wide area network (WAN) 652. Such networking environments are commonplace in office networks, enterprise-wide computer networks, intranets and the internet, which are all types of networks.

When used in a LAN-networking environment, the computer 620 is connected to the LAN 651 through a network interface or adapter 653, which is one type of communications device. In some embodiments, when used in a WAN-networking environment, the computer 620 typically includes a modem 654 (another type of communications device) or any other type of communications device, e.g., a wireless transceiver, for establishing communications over the wide-area network 652, such as the internet. The modem 654, which may be internal or external, is connected to the system bus 623 via the serial port interface 646. In a networked environment, program modules depicted relative to the computer 620 can be stored in the remote memory storage device 50 of remote computer, or server 649. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

The Abstract is provided to comply with 37 C.F.R. §1.72(b) is submitted with the understanding that it will not be used to limit the scope or meaning of the claims.

The invention claimed is:
1. A method comprising:
training a computer implemented Bayesian based diagnostic system, wherein training includes providing the diagnostic system with historical input data and a corresponding diagnosis to be derived from the historical input data and providing new input data having a predetermined diagnosis, wherein the diagnostic system generates a conditional probability table of a new diagnosis using the new input data;
generating a confidence indicator corresponding to the new diagnosis, wherein the confidence indicator is generated on a per-diagnosis basis;
comparing the confidence indicator to a predetermined threshold;
using the diagnostic system to obtain another diagnosis using other input data in response to determining the confidence indicator of the new diagnosis is greater than a predetermined threshold, the another diagnosis including a corresponding accuracy measure; and
generating a cumulative confidence indicator for multiple per-diagnosis confidence intervals, the cumulative confidence indicator including the determined confidence indicator.

2. The method of claim 1 wherein the confidence indicator is calculated in accordance with:

$$\text{confidence indicator, } c_{ij}=1-p_{ij}(1-p_{ij})/\{\alpha(\log N_{ij})\}$$

where, $p_{ij}$=prior probability of test $T_j$ failing when component $B_i$ is bad
$N_{ij}$=number of observations involving $T_j$ and $B_i$, and
$\alpha$=a constant to normalize variance between 0 and 1.

3. The method of claim 2 wherein $\alpha$ is 0.25.

4. The method of claim 3 and wherein generating a cumulative confidence indicator for multiple per-diagnosis confidence indicators includes generating the cumulative confidence indicator, wherein given a set of failed tests $T=\{T_1, T_2, \ldots, T_t\}$, the cumulative confidence indicator is defined as:

$$C_k = \frac{1}{t}\sum_{j=0}^{t} c_{kj}$$

for each component $B_k$, where t is the number of tests that failed, and $c_{kj}$ is the confidence level of $B_k$ with respect to test $T_j$.

5. The method of claim 4 and wherein generating a cumulative confidence indicator for multiple per-diagnosis confidence intervals indicators includes generating the cumulative confidence indicator, wherein individual confidence indicators are weighted with probabilities.

6. The method of claim 1 wherein the confidence indicator comprises a confidence interval corresponding to the accuracy of the diagnosis.

7. The method of claim 6 wherein the confidence interval is a function of a standard normal distribution corresponding to the probability of a certain decision.

8. A system comprising:
a computer implemented Bayesian diagnostic system, wherein the diagnostic system includes an inferencing engine and a conditional probability table stored on a non-transitory storage device that forms the basis for Bayesian inferences once the diagnostic system is trained, each inference including a diagnosis and associated probability of the diagnosis, wherein training the diagnostic system includes providing the diagnostic system with historical input data and a corresponding diagnosis to be derived from the historical input data and providing new input data having a predetermined diagnosis, wherein the diagnostic system generates a conditional probability table of a new diagnosis using the new input data; and
a confidence generator stored on a non-transitory storage device to receive the inferences, and generate a confidence measure for each inference, wherein the confidence indicator is generated on a per-inference basis and wherein the confidence generator further generates a cumulative confidence measure for multiple per-inference confidence intervals, and
wherein the diagnostic system is trained when the confidence indicator of the new diagnosis is greater than a predetermined threshold.

9. The system of claim 8 wherein the confidence generator is operable to calculate the confidence measure in accordance with:

$$\text{confidence, } c_{ij}=1-p_{ij}(1-p_{ij})/\{\alpha(\log N_{ij})\}$$

where, $p_{ij}$=prior probability of test $T_j$ failing when component $B_i$ is bad
$N_{ij}$=number of observations involving $T_j$ and $B_i$, and
$\alpha$=a constant to normalize variance between 0 and 1.

10. The system of claim 8 wherein the confidence generator to generate the cumulative confidence measure for multiple inference confidence indicators included the confidence generator to generate the cumulative confidence measure, wherein given a set of failed tests $T=\{T_1, T_2, \ldots, T_t\}$, the cumulative confidence measure is defined as:

$$C_k = \frac{1}{t}\sum_{j=0}^{t} c_{kj}$$

for each component $B_k$, where t is the number of tests that failed, and $c_{kj}$ is the confidence level of $B_k$ with respect to test $T_j$.

11. The system of claim 10 wherein individual confidences are weighted with probabilities.

12. The system of claim 8 wherein the confidence indicator comprises a confidence interval corresponding to the accuracy of the diagnosis.

13. The system of claim 8 wherein the confidence interval is a function of a standard normal distribution corresponding to the probability of a certain decision.

14. A non-transitory computer readable device having instruction stored thereon to cause a computer to implement a method comprising:
using a trained computer implemented Bayesian based diagnostic system to obtain a diagnosis with an accuracy measure, wherein training a computer implemented Bayesian based diagnostic system, wherein training includes providing the diagnostic system with historical input data and a corresponding diagnosis to be derived from the historical input data and providing new input data having a predetermined diagnosis, wherein the diagnostic system generates a conditional probability table of a new diagnosis using the new input data;
generating a confidence indicator corresponding to the new diagnosis; and
storing the confidence indicator on a computer readable device, wherein the confidence indicator is generated on a per-diagnosis basis;
comparing the confidence indicator to a predetermined threshold;
using the diagnostic system to obtain another diagnosis using other input data in response to determining the confidence indicator of the new diagnosis is greater than a predetermined threshold, the another diagnosis including a corresponding accuracy measure; and
generating a cumulative confidence indicator for multiple per-diagnosis confidence intervals, the cumulative confidence indicator including the determined confidence indicator.

15. The device of claim 14 wherein the confidence indicator is calculated in accordance with:

$$\text{confidence, } c_{ij}=1-p_{ij}(1-p_{ij})/\{\alpha(\log N_{ij})\}$$

where, $p_{ij}$=prior probability of test $T_j$ failing when component $B_i$ is bad
$N_{ij}$=number of observations involving $T_j$ and $B_i$, and
$\alpha$=a constant to normalize variance between 0 and 1.

16. The device of claim 15 and wherein generating a cumulative confidence indicator for multiple per-diagnosis confidence indicators include generating a cumulative confidence indicator, wherein given a set of failed tests $T=\{T_1, T_2, \ldots, T_t\}$, the cumulative confidence indicator is defined as:

$$C_k = \frac{1}{t}\sum_{j=0}^{t} c_{kj}$$

for each component $B_k$, where t is the number of tests that failed, and $c_{kj}$ is the confidence level of $B_k$ with respect to test $T_j$.

17. The device of claim 15 and wherein generating a cumulative confidence indicator for multiple per-diagnosis confidence intervals includes generating a cumulative confidence indicator, wherein individual confidences are weighted with probabilities.

18. The device of claim 14 wherein the confidence indicator comprises a confidence interval corresponding to the accuracy of the diagnosis, wherein the confidence interval is a function of a standard normal distribution corresponding to the probability of a certain decision.

* * * * *